May 26, 1953  H. L. POTTER  2,639,954
SEALED BEARING
Filed May 11, 1948
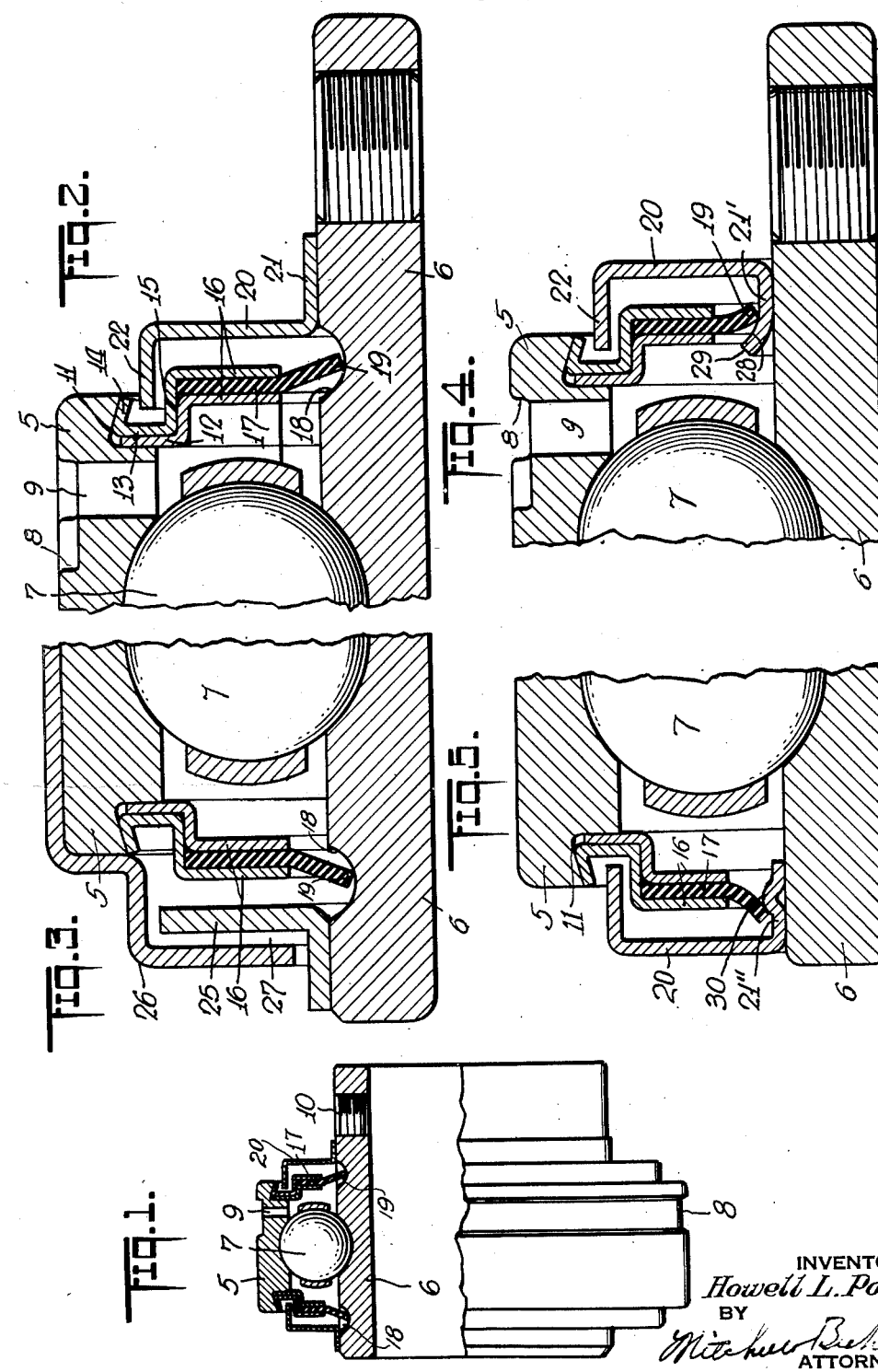
INVENTOR
Howell L. Potter
BY
ATTORNEYS Patented May 26, 1953

2,639,954

UNITED STATES PATENT OFFICE 2,639,954

SEALED BEARING

Howell L. Potter, New Britain, Conn., assignor to The Fafnir Bearing Company, New Britain, Conn., a corporation of Connecticut Application May 11, 1948, Serial No. 26,319

8 Claims. (Cl. 308—187.2)

My invention relates to an antifriction bearing and more particularly to improved sealing means therefor.

My improved bearing is particularly though not exclusively adapted for use in such locations as refrigerator cars where there are often considerable moisture and other bearing contaminants and where the bearings are often in a position to be subjected to the high pressure water or steam used in cleaning the cars where the bearing may be situated.

My improved bearing and seal may be embodied in a type of bearing which may be lubricated by an ordinary grease or oil feeding means and is so arranged that any excess lubricant applied to the bearing, or leaking from the bearing, may be quite freely vented and will serve to carry possible contaminants outwardly and away from the bearing surfaces.

It is an object of the invention to provide an improved sealing means for an antifriction bearing.

It is another object to provide an improved sealing means for an antifriction bearing, so arranged as to freely vent excess lubricant from the bearing and to carry contaminants away from the bearing surfaces.

It is another object to provide an improved sealing means for an antifriction bearing, including a relatively delicate sealing valve means together with protective means therefor.

Other objects and various features of novelty and invention will be hereinafter pointed out or will become apparent to those skilled in the art.

In the drawings which show, for illustrative purposes only, preferred forms of the invention—

Fig. 1 is a side view in partial section of an antifriction bearing embodying one form of the invention;

Fig. 2 is an enlarged fragmentary sectional view of the bearing shown in Fig. 1;

Fig. 3 is an enlarged fragmentary sectional view of a bearing like that of Fig. 1, but illustrating a slight modification, and showing the left hand side of the bearing of Fig. 1;

Fig. 4 is a view similar to Fig. 2, but illustrating another modification;

Fig. 5 is a view similar to Fig. 3, but illustrating a still further modification.

In the preferred form, the bearing is sealed at both sides of the antifriction bearing members, but in some situations a seal at one side will suffice, and a description of the seal at one side may be considered as typical of seals which may be applied to both sides.

In said drawings, the bearing comprises an outer bearing ring 5, an inner bearing ring 6, with interposed antifriction bearing members shown as balls 7. These balls run in raceway grooves in the rings 5 and 6 in the usual manner and serve to space the rings apart in a radial direction and hold them against substantial relative movement axially. If desired, lubricant may be introduced through any suitable grease fitting in a housing (not shown) and into a circumferential groove 8 in the outer bearing ring. From the groove 8, lubricant passages 9 lead to the interior of the bearing, that is, into the space between the rings and about the antifriction bearing members. In the particular form shown, the inner ring 6 is a long inner ring and is designed to be held on a shaft as by means of one or more headless set screws 10, as will be understood, but it should be clear that the invention is not limited to the particular bearing shown nor to the relative lengths of the rings.

The sealing means for the bearing includes a sealing valve, which is preferably arranged for opening toward the outside of the bearing and for closing toward the inside of the bearing. In addition to the seal valve, I provide a combined protective and labyrinth plate, which may be in the form of a slinger carried by the movable ring. The space between the seal valve and the slinger preferably constitutes a rather restricted passage or labyrinth for receiving excess lubricant from the interior of the bearing and thus resists the entry of contaminants into the bearing and tends to carry contaminants to the outside of the bearing either centrifugally, due to rotation of one or the other of the sealing or labyrinth parts, or due to the mere mechanical flow of lubricant due to overgreasing or heating of the bearing, with consequent expansion of the lubricant or air trapped therein.

In that form of the invention shown in Figs. 1 and 2, the outer ring carries a seal valve, while the inner ring has an integral seating surface for the sealing valve. The inner ring carries a protecting slinger and labyrinth plate. As illustrated, the outer ring at the edge has an undercut groove 11, and two annular plates are seated in said groove. The inner plate 12 may simply rest on an anvil or shoulder at the inner edge of the groove, while the outer plate 13 abuts the plate 12 and is swaged or otherwise held in the groove, as indicated at 14. The plates 12—13 are preferably flat radially at their outer edges and then extend axially outwardly, as shown at 15, and then in spaced apart relationship radially inwardly as indicated at 16. The seal valve 17 is carried by and between the spaced apart portion 16 of the plates and extends inwardly to the inner ring. The inner ring, in the form shown, has an outwardly facing annular groove 18 preferably rounded, and the inner side of the groove serves as a seat for the seal valve 17. The seal valve is preferably though not necessarily formed of synthetic rubber, which is impervious to lubricants, but, in any event, the seal valve should have considerable resiliency since the inner edge 19 of the seal valve is designed to seat on the inner surface of the groove 18 preferably by its inherent resiliency.

It will be seen that an excess of lubricant on the interior of the bearing will serve to raise the seal valve from its seat 18 and permit passage of excess lubricant to the exterior of the bearing. At the outer side of the seal valve is a plate 20, which, in the form shown, is a radially extending flange spaced from but relatively closely adjacent to the seal valve and associated parts. The plate 20 may be a flange on a sleeve 21, press fitted or otherwise secured to the inner bearing ring. At the radially outward edge of the flange 20, the edge is turned inwardly, as shown at 22, and is preferably tucked into the space between the part 13 of the seal plate and is axially inwardly of the outer edge of the ring. Thus, at the outside of the seal valve, there is a restricted passage which may be considered a labyrinth for receiving excess lubricant passing from the inside of the bearing. The excess lubricant will substantially fill the labyrinth passage referred to and thus effectively hold contaminants from reaching the seal valve and eventually working into the bearing. As more excess lubricant is forced from the bearing, the lubricant in the labyrinth passage will be forced to the outside of the bearing. Furthermore, during rotation of the slinger flange, some of the excess lubricant in the labyrinth passage may be slung out centrifugally so as to carry contaminants with it, and the rotation of the slinger will tend to sling off dust or water droplets or other contaminants which may reach the outside of the bearing. The flinger on the inner ring is preferably of sheet steel and will serve as an efficient mechanical protector for the more delicate seal valve and associated parts. The plates 12—13 are preferably held permanently in the outer ring as by the swaged connection heretofore referred to so that there is little or no danger that the plates and seal valve will be forced outwardly in case the bearing should be subjected to excessive pressure due to over-lubrication or due to heating. As has been indicated, any excess pressure in the bearing, instead of forcing the plates 12—14 out, will simply lift the seal valve from its seat 18 and permit the escape of lubricant from the inside of the bearing.

In the modification shown in Fig. 3, the seal valve and associated parts are the same as those heretofore described and are given the same reference characters. The flinger in Fig. 3 is merely a radially outwardly extending flange 25 terminating at the outer radial edge and not turned in as shown at 22 in Fig. 2. Since the arrangement shown in Fig. 3 would tend to permit foreign matter to fall or work into the space between the flange 25 and plate 16, I preferably provide a shield or plate 26, carried by the outer ring or the housing for the outer ring. Such a shield plate 26 will prevent the ready access of foreign matter to the space between the plates 16 and 25. Rotation of the inner ring in Fig. 3 will tend to throw lubricant outwardly and when there is an excess of lubricant in the labyrinth passage, it will be forced therefrom by the fluid pressure into and through the passage 27 to the outside of the bearing.

In the modification shown in Fig. 4, the seal valve arrangement is substantially the same as that heretofore described, but instead of forming a seat for the seal valve in a groove formed in the inner ring, I provide a seat on a separate member carried by the inner ring. In the form shown, the sleeve 21', press-fitted or otherwise secured to the inner ring, has the same type of flange 20 and inturned end 22, as shown in Figs. 1 and 2. The sleeve 21' in Fig. 4 is turned inwardly rather than outwardly, as shown in Fig. 2, and the inner edge is turned upwardly and provides an annular seat surface 28 for the edge 19 of the seal valve.

All of the parts of the modification shown in Fig. 4 may be preassembled more or less as shown in Fig. 4 and then assembled somewhat unitarily with the inner and outer rings, or, if desired, the seal valve portion of the seal may be first assembled with the outer ring in the usual fashion and thereafter the slinger sleeve 21' may be pressed onto the inner ring. In the latter case, the inner valve 17 would probably hang up on the inner end of the sleeve 21' and thus open inwardly instead of outwardly as with the preceding forms. The seal valve in Fig. 4, after complete assembly, could be moved to the position shown in Fig. 4 by a blast of air on the inside of the bearing creating sufficient pressure to force the seal valve over the inner projection 29 of the sleeve 21' so as to cause it to position itself as shown in Fig. 4, so that it will function in the same manner as the seal valves heretofore described. Instead of blowing the seal valve into place by a blast of air as described, lubricant itself may be pumped into the bearing so as to stretch the seal valve and force it over into the position shown in Fig. 4.

In that form of the invention shown in Fig. 5, the parts are substantially the same as those shown in Fig. 4 except that the flinger sleeve 21'' has an annular hump seat 30 therein. Here, again, the parts could be assembled more or less unitarily with the seal valve engaging the opposite side of the ridge 30 as heretofore described in connection with Fig. 4 and by a blast of air, or by pumping lubricant into the bearing, the seal valve could be forced over to the left of the ridge 30 so that the seal valve will function normally and open outwardly of the bearing.

All of the bearings and seals will operate in substantially the same manner. An excess of lubricant or an excess of air pressure inside the bearing will have little or no tendency to snap the seal valve parts out of the outer ring because the seal valve itself will open very readily to permit the egress of any excess lubricant and relieve any excessive pressure inside the bearing. The seal valve will close toward the inside of the bearing so as to effectively seal the bearing against the ingress of contaminants. The flinger will serve as a mechanical protection to the seal valve parts and at the same time will form part of the labyrinth for holding excess lubricant exuding from the bearing and carry such excess lubricant with any contained contaminants to the outside of the bearing. The labyrinth passages may be readily flushed out simply by pumping grease or other lubricant into the bearing. The seal valve parts will ordinarily be protected from direct impingement of water, steam, or air normally used for cleaning the apparatus in which the bearing may be installed, and when the bearing is running, dust and other contaminants will be quite effectively thrown away from the bearing and never reach even the labyrinth portion of any of the passages.

While the invention has been described in considerable detail and preferred forms illustrated, it is to be understood that changes may be made within the scope of the invention as defined in the appended claims.

I claim:

1. In an antifriction bearing comprising inner and outer bearing rings with interposed antifriction bearing members, said outer ring having an undercut groove in one edge, said inner ring having an annular seal groove formed in the outer surface thereof, seal means permanently secured in said undercut groove and carrying a resilient seal valve extending into engagement with one side of said seal groove and held in sealing engagement therewith by the inherent resiliency of said seal valve, whereby ingress of foreign matter is resisted by the seating of said seal valve against said one side of said seal groove and whereby lubricant pressure in the space between said rings and about said antifriction bearing members may lift said seal valve from its seat and permit egress of lubricant past said seal valve, and a sheet-metal seal-plate including an integral sleeve hub permanently carried by said inner ring and lying in closely spaced relation to and at the outside of said seal valve and forming with said seal valve a labyrinth space to receive lubricant passing said seal valve, whereby lubricant from the space between said bearing rings and about said antifriction bearing members and at the inside of said seal means may pass said seal valve and enter said labyrinth space, and whereby lubricant and foreign matter in said labyrinth space will be prevented by said seal valve from entering the space between said rings at the inner side of said seal means.

2. In an antifriction bearing including inner and outer bearing rings with interposed antifriction bearing members, seal means carried by one of said rings and extending toward the other of said rings, said seal means including a resilient seal valve, a slinger carried by the other of said rings and having a seating surface for said seal valve, said slinger including an outwardly directed flange forming a labyrinth with said seal means and serving to protect said seal means against mechanical injury.

3. In an antifriction bearing including inner and outer bearing rings with interposed antifriction bearing members, said outer ring having an undercut groove in the edge thereof, two plates seated in said groove, at least one of said plates being swaged into said groove to permanently hold both plates in said outer bearing ring, said plates extending generally radially toward said inner ring, a seal valve including a disc of flexible and resilient material carried by and between said plates, said disc including an annular part projecting generally radially inwardly, said inner ring having a generally radially directed seating surface for said seal valve, said annular part being axially flexed into seating contact with said seating surface, and said seal valve opening outwardly of the bearing and closing inwardly, the outer of said plates including an axially outwardly extending portion radially clearing the lip of the undercut groove, a slinger carried by said inner ring and extending generally radially outwardly and including an axially inwardly directed skirt extending into the clearance between said outer plate and the lip of the undercut groove so as to form a labyrinth with said seal valve and the outer of said plates, whereby lubricant passing outwardly past said seal valve will pass into said labyrinth and be carried outwardly by the centrifugal action of said slinger, and whereby said slinger may serve as mechanical protection for said plates and seal valve.

4. In the combination defined in claim 3, said inner ring having an annular groove in the outer surface thereof, the side of said groove toward said antifriction bearing members serving as said seating surface for said seal valve.

5. In an antifriction bearing including inner and outer bearing rings with interposed antifriction members, a two-plate sheet-metal labyrinth seal, both plates including corresponding generally radially extending and axially extending overlapping portions in clearance with each other, means rigidly securing the axially inner of said plates to the outer bearing ring, the other of said plates including a sleeve hub riding the inner bearing ring, means providing a generally radially directed valve-seat surface associated with said inner bearing ring, and an annular flexible seal-valve disc supported by the radially extending part of said axially inner plate and extending into resilient axially stressed contact with said seat surface.

6. In an antifriction bearing including inner and outer bearing rings with interposed antifriction members, the outer bearing ring having at one end an undercut groove terminating at a radial shoulder, seal means including first and second plate members in said groove, the outer of said plate members being tightly fitted in said groove and stressing the inner plate member against said shoulder, said outer plate member including an axially extending portion radially clearing the tip of the groove, both said plate members including radially inwardly projecting axially spaced skirts, said inner ring having a peripheral groove facing the space between said skirts, a resilient seal member supported between said skirts and extending inwardly into axially stressed wiping contact with said peripheral groove, and a third plate member carried by said inner bearing ring and including a radially extending portion substantially coextensive with the skirt of said outer plate member and an inturned circumferential portion extending into the said radial clearance and in clearance relation with the lip of the first-mentioned groove and with said outer plate member.

7. An antifriction bearing according to claim 5, in which said last-defined means is a peripheral groove on said inner ring.

8. An antifriction bearing according to claim 5, in which said last-defined means is an annular radially-extending ridge constituting a part of said sleeve hub.

HOWELL L. POTTER.

References Cited in the file of this patent

UNITED STATES PATENTS

| Number | Name | Date |
| --- | --- | --- |
| Re. 20,747 | Simpson | May 31, 1938 |
| 1,533,184 | Gurney | Apr. 14, 1925 |
| 1,982,729 | Eberhard | Dec. 4, 1934 |
| 2,059,068 | Weckstein | Oct. 27, 1936 |
| 2,118,027 | Barish | May 24, 1938 |
| 2,165,155 | Schmal | July 4, 1939 |
| 2,202,769 | Brodin | May 28, 1940 |
| 2,281,010 | Reynolds | Apr. 28, 1942 |
| 2,310,607 | Batesole | Feb. 9, 1943 |